Sept. 2, 1969 V. H. OBERG 3,465,324

SYNCHRONOUS SWITCH REMOTE CONTROL SYSTEM

Filed March 23, 1966 3 Sheets-Sheet 1

INVENTOR.
VICTOR H. OBERG
BY Harvey S. Boyd
ATTORNEY

INVENTOR

VICTOR H. OBERG

BY Harry S. Boyd

ATTORNEY

SYNCHRONOUS SWITCH REMOTE CONTROL SYSTEM

Filed March 23, 1966 3 Sheets-Sheet 3

INVENTOR.
VICTOR H. OBERG
BY Harvey S. Boyd
ATTORNEY

United States Patent Office 3,465,324
Patented Sept. 2, 1969

3,465,324
SYNCHRONOUS SWITCH REMOTE CONTROL SYSTEM

Victor H. Oberg, 37 Oak Knoll Ave., San Anselmo, Calif. 94960

Filed Mar. 23, 1966, Ser. No. 538,177
Int. Cl. H04q 9/04
U.S. Cl. 343—225 6 Claims

ABSTRACT OF THE DISCLOSURE

A synchronous switch remote control system for interrogation and control of selected functions at remote stations. The system provides for manual or automatic selection of desired functions by means of switches and timing control circuits.

The invention described herein may be used by or for the Government for governmental purposes without the payment to me of any royalty thereon.

This invention relates to a synchronous switch remote control system which may be superimposed on a communication system for interrogation and control of remote recording of functions and control of a plurality of remote stations for interrogation of such selected functions. Functions may be selected manually or automatically by program timing means.

This system utilizes a series of synchronized timing motors, one at the control station, and the others at the various remote stations. Along with several other discs, a selection indicator dial with engraved functions, is attached to the shaft of these timing motors. As these functions parade past a pointer the operator selects the desired function by closing a switch. This invention therefore eliminates the necessity of dial codes.

Another object of this invention is to provide a remote control system which controls the remote recording of functions such as temperature, humidity, water level, wind velocity, and other data.

Another object is to provide a remote control system which can be superimposed upon either a radio or a two wire circuit and accomplish selection of functions while these circuits carry normal traffic.

Another object is to provide means whereby the selection of functions can be made at either the remote station or the control station, i.e., duplex operation.

Another object is to provide a system which can be interrogated at certain predetermined times on schedule.

These and other objects will be evident from the following description in which.

While this system is capable of operating in conjunction with a plurality of remote and a plurality of sub-remote stations, for purposes of explanation, only a remote and control station will be used.

Figure 4:
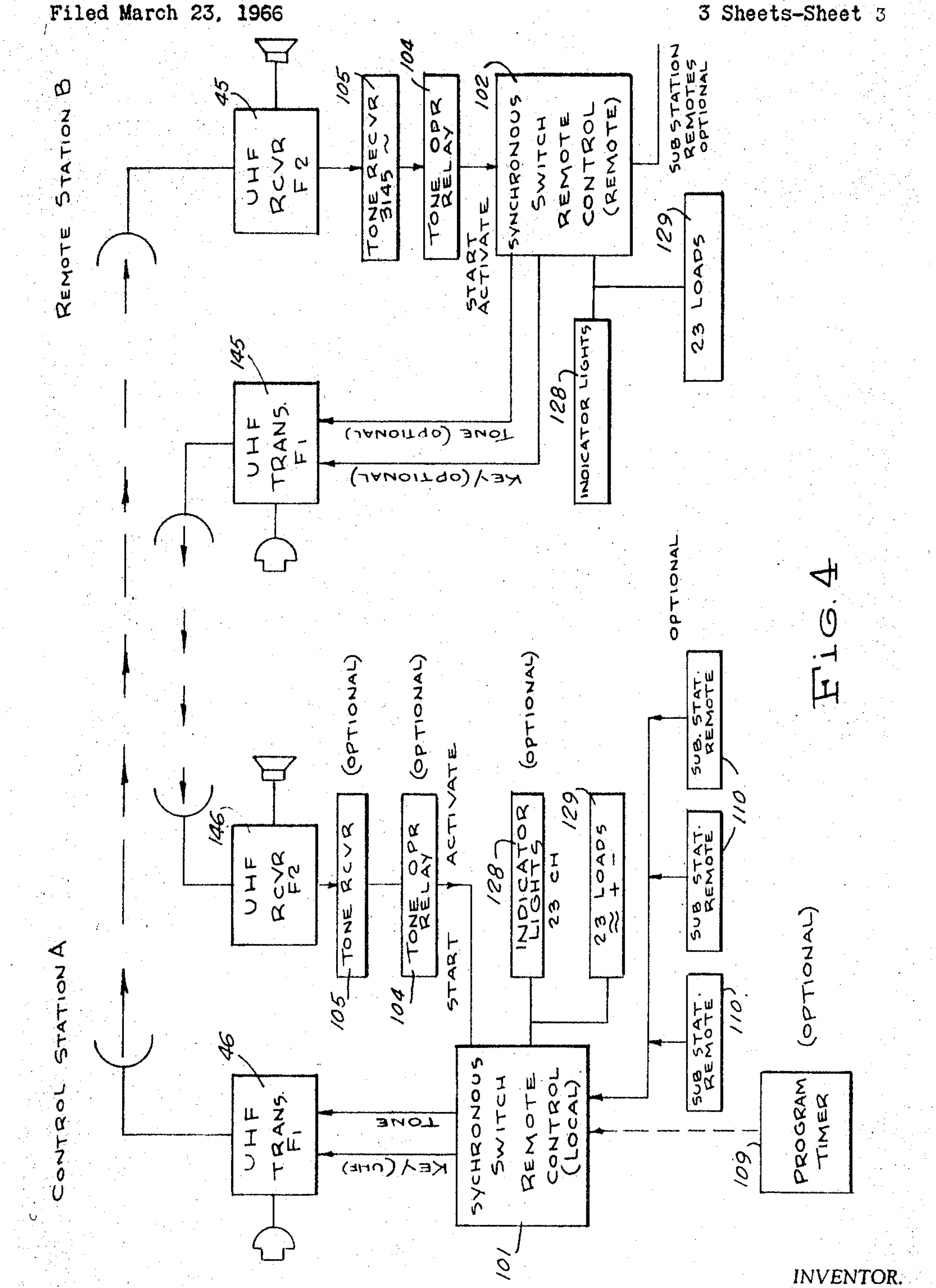
FIG. 4 is a simplified block diagram of an entire system adapted for use with radio circuits.

FIG. 4 shows the system used in conjunction with a radio communication circuit and the description which follows concerns this particular application. However, the system may be used on wire circuits and in such arrangement the U.H.F. transmitters and receivers shown are not used but the tone signals are fed directly into the wire circuits.

Figures 1, 2:
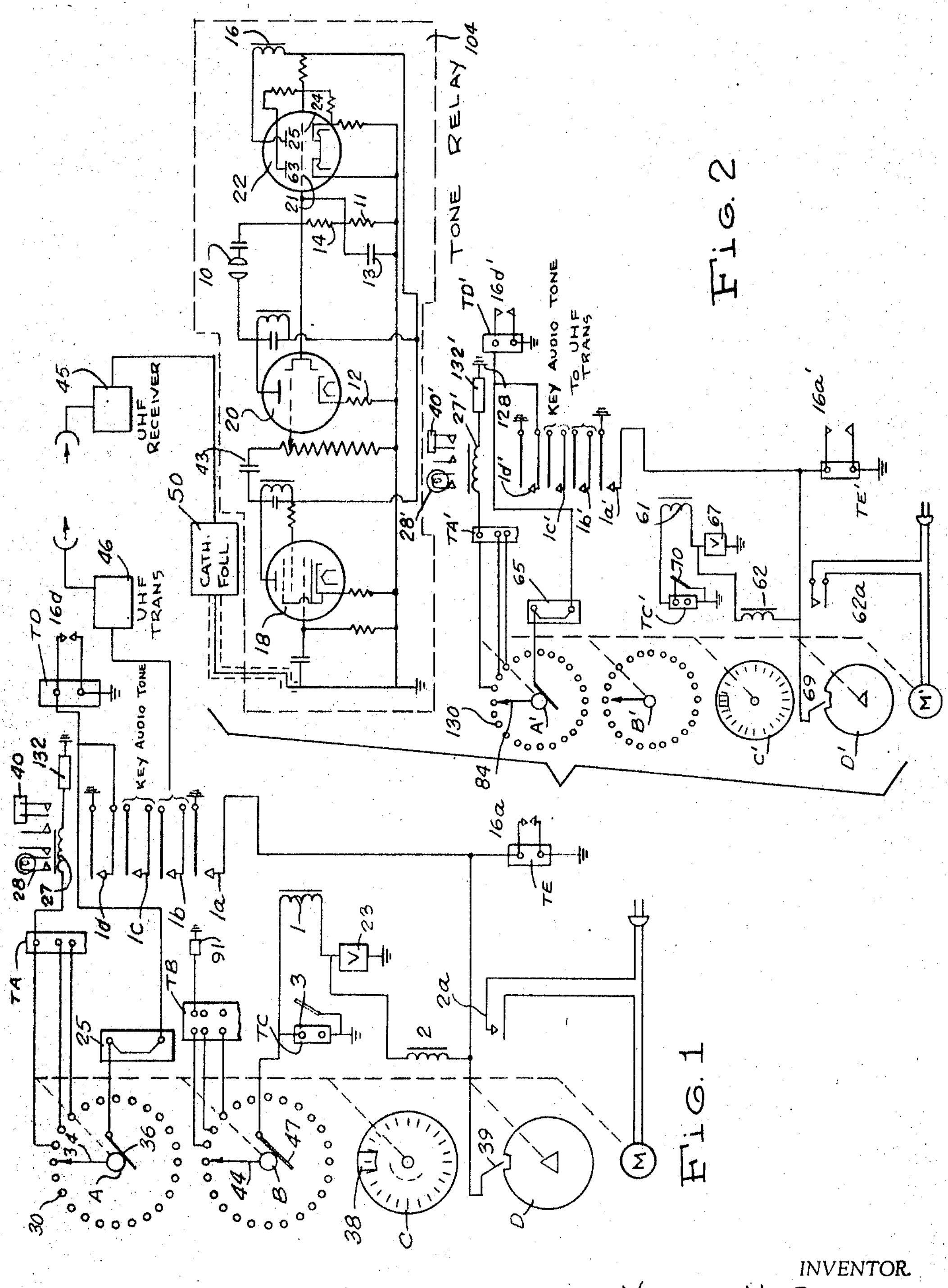
FIG. 1 shows the details of the transmitting portion of the control station.
FIG. 2 shows the details of the receiving portion of a remote station.

In FIG. 1 the disc A is constantly in contact with the conductor strip 36 which in turn terminates at the terminal strip 25. The conducting pointer 34, which rotates with disc A, provides ground to the twenty-four contact points 30 located circumferentially about disc A. These contact points are connected to terminal strip TA. The output terminal strip TA connects to each of 23 latching relay coils, only one of which (27) is shown. These relays which are the mechanical lock and electrical unlock type light pilot lamps 28 to indicate a selected load and/or switch a connected load 40. A plurality of grounded voltage sources of which 132 is typical supplies voltage to the relays. The contact points 30 supply ground to the output terminals of terminal strip TA only when the relay contacts 1*d* are closed or when contact 16*d* on terminal board TD is closed by a tone operated relay, not shown in FIG. 1, but identical to the tone relay of FIG. 2. It should be noted that if contact 16*d* on terminal board TD and relay contacts 1*d* are open, selection of functions is not possible. The switch selector 34 merely sweeps through positions 1–23 and stops on 24. In order to effectively select a given function, relay contacts 1*d* or relay contacts 16*d* must be closed in order to provide ground to one or more of the 24 circumferentially displaced contact points.

Figure 3:
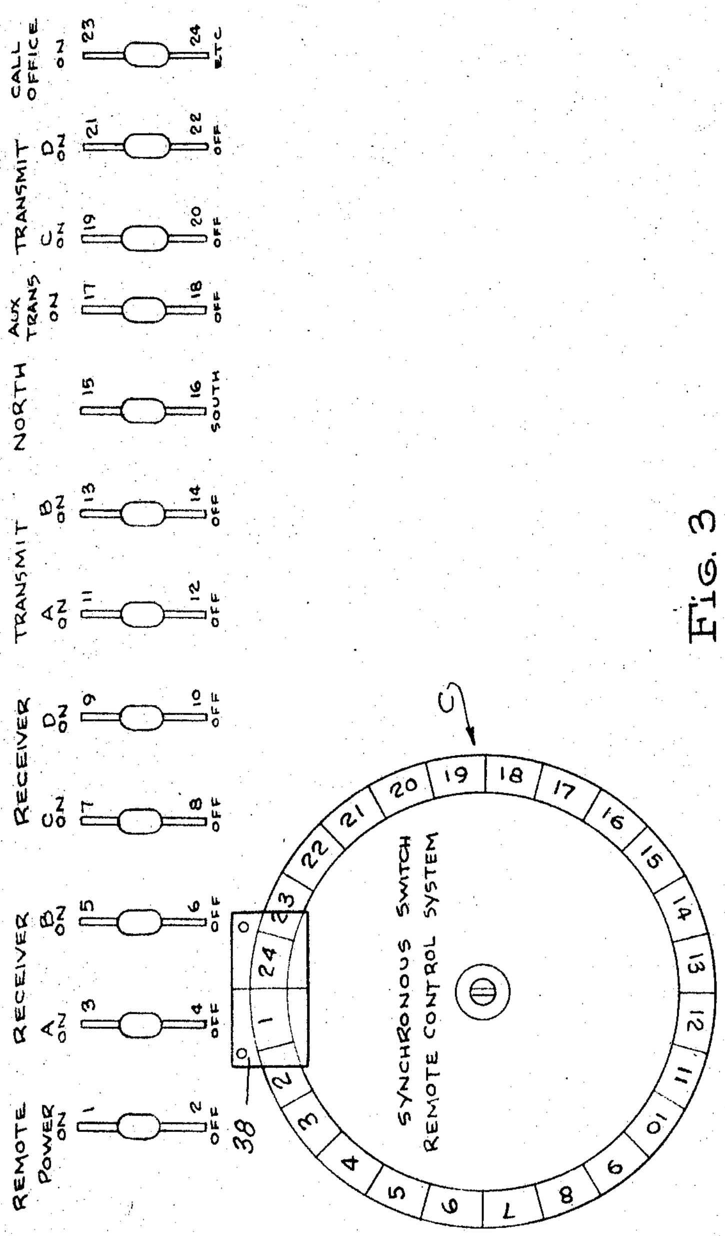
FIG. 3 shows a switch arrangement that is used to effectuate the automatic mode of operation.

Disc B, an automatic selector switch which is substantially identical to disc A, is used only when automatic selection of functions is desired. Like disc A, twenty-four contact points are located about the circumference of disc B. These 24 contact points are connected to terminal board TB. Various types of switches can be wired to terminal board TB to increase the system's flexibility; some are shown in FIG. 3. Disc B is constantly in contact with the conductor strip 47 which is connected to the energizing relay coil 1. A conducting pointer 44 which rotates with disc B provides ground to the 24 contact points about disc B. Disc B, however, is not required for the manual selection of functions procedure. It is not generally connected at the remotely controlled stations. Disc B is used for automatic selection by means of switches or wired connections on terminal board TB. This automatic selection which is more fully described later generally occurs at the control station. However, such automatic selection is not limited to the control station. It may occur at any station.

Various types of switches may be wired to TB. For example, a single pole normally open switch will enable a function to be either picked up or bypassed. A single pole-three position switch will enable automatic ON-OFF selection. A single pole multiple position switch enables selection of one of a number of loads such as any channel of a multichannel transmitter. If the single pole multiple position switches are left in the neutral or open position then manual selection is available. FIG. 3 illustrates one possible switch arrangement. Note that the 24 functions appearing on the dial correspond to the 24 switch positions shown. These 24 switch positions can be programmed to perform a variety of functions. These functions are not limited to but may include the following:

(1) Remote Power ON
(2) Remote Power OFF
(3) Receiver Channel A ON
(4) Receiver Channel A OFF
(5) Receiver Channel B ON
(6) Receiver Channel B OFF
(7) Receiver Channel C ON
(8) Receiver Channel C OFF
(9) Receiver Channel D ON
(10) Receiver Channel D OFF
(11) Transmit Channel A ON
(12) Transmit Channel A OFF
(13) Transmit Channel B ON
(14) Transmit Channel B OFF
(15) Antenna Direction North
(16) Antenna Direction South
(17) Auxiliary Transmitter ON
(18) Auxiliary Transmitter OFF
(19) Transmit Channel C ON
(20) Transmit Channel C OFF
(21) Transmit Channel D ON
(22) Transmit Channel D OFF
(23) Remote Operator Call Office
(24) Etcetera These functions are displayed upon the indicator dial C and parade past a hairline pointer 38, located at the top of the dial C. These same functions can be included in the switch arrangement shown in FIG. 3.

Disc D, made of a conducting material such as copper, has been notched in order to perform the function of starting or stopping the timing motor M. Notice that momentary closure of the starter switch 3 energizes relay 1 which causes contacts 1*a* to close. In turn, starter relay 2 is energized which causes contacts 2*a* to close, thereby completing the timing motor circuit. The notch of disc D is normally in the vertical position of FIG. 1 when the system is not in operation.

The remote station of FIG. 2 has features identical to the control station. The four discs A′, B′, C′, and D′ and motor M′ are identical in function and design to their counterparts of FIG. 1. Disc B′ is normally not connected at the remote station. The system is designed so that both motors run in synchronism. Thus when switch 3 is depressed to initiate the cycle of operation at the control station a chain of events, to be fully explained later, causes the remote motor to revolve in synchronism with the control motor. Accordingly, pointers 34 and 44, disc C and disc D at the control station, along with 84 disc C′ and disc D′ at the remote station revolve together in synchronism.

Assume that the operator desires to select a function, say number 1. First he holds momentary start switch 3 closed for approximately 2 seconds. The now energized relay 1 forces contacts 1*a*, *b*, *c*, and *d* closed. In turn relay 2 forces closed contacts 2*a* which completes the timing motor circuit. The revolving motor shaft displaces the notch of disc D from the vertical position. Conductor 39 now comes into contact with the conducting surface of the metal disc D. Relay 2 will now remain energized. Consequently the timing motor will continue to rotate, run for one revolution and shut itself off.

The closing of contacts 1*b* and *c* causes a transmitter at the control station to transmit an audio-tone which is received at the remote station wherein relay coil 16 of the tone relay closes contacts 16*a′* which in turn completes the timing motor circuit to start motor M′. In this fashion the motors run in synchronism. However, upon release of the momentary contact switch 3 at the end of about 2 seconds relay 1 is deenergized and contacts 1*a*, 1*b*, 1*c* and 1*d* are opened.

In order to select function 1 the operator closes switch 3 again, as No. 1 appears under the hairline 38. The now energized relay 1 closes contacts 1*a*, 1*b*, 1*c*, and 1*d*. Contacts 1*c* key a tone generator set at 3145 cycles per second. The signal generated modulates the U.H.F. transmitter 46 keyed by contacts 1*b*. Contact 1*d* closes the activate circuit to terminal board TA through disc A, thus picking up the latching or load relays associated with relay coil 27.

The modulated audio signal which is transmitted by the U.H.F. radio transmitter 46 appears in the output of the U.H.F. remote receiver 45 of FIG. 2. At the remote station the audio signals picked up by the U.H.F. receiver 45 are fed into an audio amplifier which is tuned to 3145 cycles per second and a cathode follower 50. In order to prevent regular speech frequencies from triggering the remote station, about one second time delay is introduced into the tone relay amplifier. Experience has shown that communications circuits by their very nature attenuate frequencies above 2700 c.p.s. Also it has been found that speech frequencies of 3145 c.p.s. rarely occur, but if they do they are never sustained for more than one second. It thus becomes apparent that this system can be superimposed upon a regular voice communications system without interruption of interference.

After passing through the small coupling capacitor 43, which blocks most of the voice frequencies, the signal is then amplified through a 6SQ7 tube 20.

The neon lamp 10 is used as an electronic switch. Normally it is extinguished and acts as an open switch but when the 3145 c.p.s. tone is present the neon lamp glows and acts as a conductor. The gain of amplifier 20 is adjusted so that the neon lamp flickers during noise peaks or during an interval when speech outside of the 3145 c.p.s. resonant frequency persists. When this condition occurs the neon lamp extinguishes and any voltage across capacitor 13 discharges through resistor 11.

After passing through the neon tube the tone is rectified through the 6SQ7 tube 20 and the resulting direct current flows through the cathode resistor 12, the resistor 11 and resistor 14. The voltage at grid 21 of tube 22 becomes more negative. Plate 63 draws less current thus causing the potential at grid 24 to become more positive. The increased plate 25 current energizes relay 16.

The neon lamp 10, the resistors 11 and 14 and the capacitor 13 negate the possibility of any noise or speech frequencies other than 3145 c.p.s. triggering the relay 16. Any voltages not directly attributable to the 3145 c.p.s. will tend to charge capacitor 13. When the neon lamp extinguishes, this voltage discharges through resistor 11. This voltage across resistor 11 and capacitor 13 will not build up sufficiently to operate relay 16 unless the 3145 c.p.s. tone is present for about one second.

When the operator at the control station depressed switch 3 to make the desired function selection (in this case number 1), the remote station responded by duplicating in synchronism the action at the control station. Since function number 1 was selected, pointer 84 at the remote station will stop at number 1 and thereby activate coil 27′ which controls pilot lamp 28′. Also discs C′ and D′ which are mounted on motor M′ duplicate the angular displacement of disc C and D at the control station.

The functions of the remote and control station can be reversed. It is necessary to connect disc B′ as hereinafter described for disc B, however, if automatic control of the selection of functions is desired from the remote station.

FIG. 4 shows the equipment necessary to enable duplex operation of the system. As shown a transmitter 46 and a receiver 146 are at the control station, while a receiver 45 and a transmitter 145 are at the remote station. This dual equipment setup allows one to initiate the interrogation process from either the remote or control station. The synchronous switch remote control unit 101 includes the basic arrangement of FIG. 1. The motor M, disc A, B, C, and D, their relay arrangements and associated circuitry as in FIG. 1 are included in the unit 101. The indicator light unit 128 includes a plurality of lamps identical to the lamp 28 shown in FIG. 1. Both the remote and control station are provided with the indicator light unit. The load units 129 graphically depict the load capabilities of disc A and disc A'. Tone receiver 105 at both remote and control stations is generally tuned to 3145 c.p.s.

For automatic selection a program timer 109 operates in conjunction with disc B within the synchronous switch remote control unit 101. The synchronous switch unit 102 at the remote station is identical to unit 101 except that disc B is generally not connected if automatic selection originates at the control station.

The system is capable of operating with a plurality of remote stations. These are expressed by units 110.

Thus as shown in FIG. 4 signals from the control station are received by the remote station which in turn cause the remote control station to run in synchronism as previously explained. After receiving the command signals the remote station may then record locally data such as temperature, humidity, water level, wind velocity and other data by means of sensors 40' which are adapted to respond to such functions or such sensors 40', representing the loads 129 in FIG. 4, may initiate operation of conventional equipment, not shown, which is capable of sending coded signals or tone signals, other than the tone signal used to activate the remote station relay 16, through the U.H.F. transmitter 145, to the control station where such tone signals are received by means of receiver 146. By correlation of the tone signals with the functions sensed at the remote station ranges of such functions may be determined and recorded at the control station. At the control station through sensors 40 such functions may be locally recorded or the sensors 40 may be used to initiate operation of conventional equipment for transmitting range of functions to a remote station by use of coded signals or tone signals.

Disc B of FIG. 1 is for automatic selection by means of switches or wired connections on terminal board TB. The switches in FIG. 3 are used to selectively apply ground to the contact points of disc B. This is accomplished by placing the switches between ground and terminal board TB. FIG. 1 illustrates this arrangement for the specific contact point 1. To complete the arrangements all of the terminals of TB should be wired as exemplified in FIG. 1. For this purpose the switches of FIG. 3 should be used. The block 91 therefore illustrates the first switch shown in FIG. 3.

The program timer 109 is used to turn the motor on at predetermined times. It thus replaces the need for manual manipulation of the switch 3. The switching arrangement of FIG. 3 replaces the requirement for manual manipulation of switch 3 when functions are desired for selection. The switches may be selectively preset to provide certain predetermined functions to be recorded when the system is operated automatically by means of the program timer. For example, if point 3 of terminal board TB is grounded then as pointer 44 sweeps across contact point 3 of disc B, relay 1 is energized. The application of ground to TB is accomplished by use of a typical switch arrangement shown in FIG. 3. As the automatic selection commences, the motors at both stations are in operation. Points 1*d* close the output circuit thereby energizing latching relay 27 and in turn the pilot lamp 28. Relay 1*c* keys an audio tone generator and 1*b* keys the U.H.F. transmitter 46. The transmitted signal proceeds to the remote station. The automatic mode of operation at the remote station is substantially identical to the manual operation.

I claim:

1. A system for selecting functions for interrogation between remote and control stations comprising:

(a) a first motor located at the control station;

(b) means for energizing said first motor including a first timing motor circuit, said timing motor circuit including means for selectively completing and breaking said circuit for activating and deactivating said motor;

(c) means for sustaining the first motor for one revolution, said means communicating with the first timing motor circuit;

(d) a rotatable indicator dial having segments for individually displaying the functions for selection, said dial mounted upon said first motor;

(e) a plurality of rotatable dials mounted on said first motor, each said dial having radially spaced contact points and a contact arm adapted to engage said contact points;

(f) means for individually selecting the functions without interrupting the rotation of the first motor;

(g) transmitting means including tone signal generating means at the control station for transmitting a starting signal to said remote station simultaneously with starting of said first motor and a selection signal simultaneously upon selection of the functions to the remote station;

(h) a control and remote station receiver;

(i) a tone signal actuated relay connected to each said receiver;

(j) an output coil connected to each said tone signal actuated relay;

(k) a second motor located at the remote station;

(l) means for starting said second motor including a second timing motor circuit, said second timing motor circuit including means for selectively completing and breaking said circuit for activating and deactivating said second motor, said second timing motor circuit activated by the remote station output coil upon receipt of the starting signal from the control station, thereby starting said second motor in synchronism with said first motor;

(m) means for sustaining said second motor for one revolution, said means communicating with said second timing motor circuit;

(n) a rotatable indicator dial having segments for individually displaying the functions for selection mounted on said second motor;

(o) indicating and sensing means at the control and remote stations, said indicating and sensing means activated by the output coils at the control and remote stations, said sensing means selectively activating said transmitting means at each of said control and remote stations for transmitting signals correlated with functions interrogated by said sensing means selectively to said control and remote stations wherein such signals are transformed into values related to the functions to which said sensing means are responsive;

(p) a plurality of rotatable dials mounted on said second motor, each said dial having radially spaced contact points and a contact arm adapted to engage said contact points, said indicating and sensing means included in circuits connected to the contact points of one of said dials and a plurality of switches connected to the contact points of another of said dials; and (q) program timing means coacting with said one dial connected to said plurality of switches for initiating the selection of functions in a predetermined pattern for transmission and reception between the control and remote stations during one revolution of said dials.

2. The system as defined in claim 1 wherein said tone signal actuated relay includes time delay means for insuring that only the desired tone frequency actuates said relay.

3. In a system for receiving functions transmitted from a control station having a first motor, a remote station comprising:

(a) a receiver;

(b) a tone relay fed by said receiver, said tone relay including time delay means for insuring that only the desired tone frequency is passed for energization of the relay coil portion thereof;

(c) a relay coil fed by said tone relay;

(d) a plurality of relay contacts activated by said relay coil;

(e) a second motor located at the remote station, and in synchronism with the first motor at the control station;

(f) a first indicator dial displaying the selected function mounted upon said second motor;

(g) means activated by said relay contacts for starting said second motor, said means including a timing motor circuit, said timing motor circuit including means for selectively completing and breaking said circuit for activating and deactivating said second motor thereby runnng the second motor in synchronism with the first motor;

(h) a second function selector dial including a plurality of spaced contact points and a rotating contact arm driven by said second motor and adapted to contact said plurality of spaced contact points, said contact arm completing circuits through said contact points upon activation of said relay contacts responsive to reception through said receiver of selected functions from the control station;

(i) sensing and indicating means electromagnetically connected to said plurality of spaced contact points and activated upon selective engagement of said contact arm with said plurality of contact points; and (j) transmission means activated by said sensing means for relaying signals correlated with said sensing means to the control station.

4. The system of claim 3 wherein the timing motor circuit further includes:

(a) a disc having a conducting periphery with a notched portion mounted on said second motor; and (b) a conductor, one end connected to one of said relay contacts and the other end in contact with said conducting periphery as the motor revolves providing circuit continuity to energize said motor, said circuit continuity being broken when said conductor falls within said notched portion thereby deenergizing said motor after one revolution of rotation.

5. The system as recited in claim 3 further including:

(a) a third dial having radially spaced contact points and a rotatable contact arm mounted upon said second motor adapted to engage said contact points, a plurality of preset switches controlling predetermined functions connected to each of said contact points and included in circuits completed upon contact of said contact arm with said contact points upon synchronous rotation of said contact arm with said first indicator dial; and (b) program timing means coacting with said third dial for initiating the selection of a function as determined by said preset switches for transmission of selected functions to a control station during one revolution of said third dial.

6. The system of claim 3 wherein the tone relay further includes:

(a) a first amplifier stage coupled to said receiver;

(b) a coupling capacitor connected to the output of said first stage for blocking undesired frequencies and passing the desired frequency;

(c) a second amplifier stage coupled to said coupling capacitor for amplifying the passed signal;

(d) neon tube switching means responsive to the desired frequency signal for coupling the signal to said second amplifier stage; and (e) a third amplifier stage coupled to said second stage and said neon tube switching means for amplifying the desired signal to control the operation of the relay portion of the tone relay.

References Cited

UNITED STATES PATENTS

| | | | |
|---|---|---|---|
| 2,676,289 | 4/1954 | Wolfsberg et al. | |
| 2,875,327 | 2/1959 | Halvorson et al. | 178—53.1 XR |
| 3,025,496 | 3/1962 | Schmid et al. | 340—164 |
| 3,210,730 | 10/1965 | Ehrat | 340—164 XR |

DONALD J. YUSKO, Primary Examiner

U.S. Cl. X.R.

340—164, 318